United States Patent
Jan et al.

(10) Patent No.: US 11,619,978 B2
(45) Date of Patent: Apr. 4, 2023

(54) ELECTRONIC DEVICE AND HINGE STRUCTURE

(71) Applicants: Cheng-Shiue Jan, Taipei (TW);
Chia-Hao Hsu, Taipei (TW);
Chien-Chu Chen, Taipei (TW);
Wei-Hao Lan, Taipei (TW)

(72) Inventors: Cheng-Shiue Jan, Taipei (TW);
Chia-Hao Hsu, Taipei (TW);
Chien-Chu Chen, Taipei (TW);
Wei-Hao Lan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 139 days.

(21) Appl. No.: 17/019,344

(22) Filed: Sep. 13, 2020

(65) Prior Publication Data

US 2021/0081007 A1 Mar. 18, 2021

Related U.S. Application Data

(60) Provisional application No. 62/901,763, filed on Sep. 17, 2019.

(51) Int. Cl.
*G06F 1/16* (2006.01)
(52) U.S. Cl.
CPC ................ *G06F 1/1681* (2013.01)
(58) Field of Classification Search
CPC ..... G06F 1/1681; G06F 1/1618; G06F 1/1624
See application file for complete search history.

(56) References Cited

U.S. PATENT DOCUMENTS

| | | | | |
|---|---|---|---|---|
| 9,874,906 B1* | 1/2018 | Hsu | ........................ | G06F 1/1641 |
| 10,257,331 B2* | 4/2019 | Lin | ........................ | H04M 1/022 |
| 10,274,996 B2* | 4/2019 | Lin | ........................ | E05D 3/06 |
| 10,447,829 B2* | 10/2019 | Lin | ..................... | H04M 1/0216 |
| 10,659,576 B1* | 5/2020 | Hsu | ........................ | H04M 1/0268 |
| 10,754,395 B2* | 8/2020 | Sanchez | ................. | H05K 5/0086 |
| 10,827,633 B2* | 11/2020 | Yoo | ......................... | E05D 3/122 |

(Continued)

FOREIGN PATENT DOCUMENTS

| | | | | |
|---|---|---|---|---|
| CN | 209543202 | | 10/2019 | |
| JP | 2020067907 A | * | 4/2020 | .............. F16C 11/04 |
| TW | M493241 | | 1/2015 | |

*Primary Examiner* — Anthony M Haughton
*Assistant Examiner* — Theron S Milliser
(74) *Attorney, Agent, or Firm* — JCIPRNET

(57) ABSTRACT

An electronic device including two bodies and at least one hinge structure including a connecting assembly and two rotating assemblies is provided. Each rotating assembly is rotatably connected to the connecting assembly and includes a bracket having at least one first sliding slot, a translation member translatably arranged on the bracket and having at least one second sliding slot, and a sliding member having at least one pillar penetrating the first second sliding slots at an overlapping position. The first and second sliding slots are inclined to each other and partially overlapped at the overlapping position. The two bodies are respectively connected to the sliding members. When each rotating assembly rotates, the connecting assembly guides the translation member to translate relative to the bracket to displace the overlapping position and drive the pillar to slide along the first and second slots to move the sliding member and the corresponding body.

16 Claims, 17 Drawing Sheets

(56) References Cited

U.S. PATENT DOCUMENTS

| | | | | |
|---|---|---|---|---|
| 10,856,430 | B2* | 12/2020 | Yoo | E05D 3/122 |
| 11,032,929 | B2* | 6/2021 | Yoo | H05K 1/189 |
| 11,243,578 | B2* | 2/2022 | Torres | G06F 1/1616 |
| 2018/0309861 | A1* | 10/2018 | Lin | H04M 1/021 |
| 2018/0324964 | A1* | 11/2018 | Yoo | G06F 1/1652 |
| 2019/0191021 | A1* | 6/2019 | Lin | G06F 1/1681 |
| 2020/0233466 | A1* | 7/2020 | Sanchez | H05K 5/0017 |
| 2021/0034116 | A1* | 2/2021 | Torres | G06F 1/1616 |
| 2021/0034117 | A1* | 2/2021 | Torres | E05D 3/06 |
| 2021/0064084 | A1* | 3/2021 | Lin | G06F 1/1681 |

* cited by examiner

ELECTRONIC DEVICE AND HINGE STRUCTURE

CROSS-REFERENCE TO RELATED APPLICATION

This application claims the priority benefit of U.S. provisional application Ser. No. 62/901,763, filed on Sep. 17, 2019. The entirety of the above-mentioned patent application is hereby incorporated by reference herein and made a part of specification.

BACKGROUND

Technical Field

The invention relates to an electronic device and a hinge structure, and particularly relates to a folding electronic device and a hinge structure thereof.

Description of Related Art

Along with popularity and development of notebook computers, consumers' demands on the operational convenience and versatility of notebook computers are also increasing. In some notebook computers, two bodies are provided with display surfaces to provide dual screens. The two bodies may be rotated 180 degrees relative to each other to be arranged flatly, or the two bodies may be rotated 360 degrees relative to each other to be reversely folded for operation under a tablet computer operation mode. In order to change the relative positions between the two display surfaces in response to different rotating angles of the two bodies, a linkage structure is disposed in the hinge structure of some notebook computers, so as to drive the two bodies to move relatively to each other. However, the linkage structure generally includes a complicated link mechanism, which occupies a configuration space of the electronic device. Besides, it is difficult to manufacture and assemble such a linkage structure, so the assembling and actuation accuracy may be affected.

SUMMARY

The invention is directed to an electronic device and a hinge structure, which drive bodies to move relative to each other through simplified assemblies.

The invention provides an electronic device including two bodies and at least one hinge structure. The hinge structure includes a connecting assembly and two rotating assemblies. The connecting assembly has two first guide portions. Each of the rotating assemblies is rotatably connected to the connecting assembly and includes a bracket, a translation member and a sliding member. The bracket has at least one first sliding slot. The translation member is translatably arranged on the bracket and has a second guide portion and at least one second sliding slot. The two first guide portions respectively correspond to the two second guide portions, and the first sliding slot and the second sliding slot are inclined to each other and partially overlapped at an overlapping position. The sliding member has at least one pillar, and the pillar penetrates the first sliding slot and the second sliding slot at the overlapping position. The two bodies are respectively connected to the two sliding members. When each of the rotating assemblies rotates relative to the connecting assembly, the first guide portion and the second guide portion guide the translation member to translate relative to the bracket to displace the overlapping position, so as to drive the pillar to slide along the first sliding slot and the second sliding slot to drive the sliding member and the corresponding body to move.

The invention provides a hinge structure including a connecting assembly and two rotating assemblies, the connecting assembly has two first guide portions, and each of the rotating assemblies is rotatably connected to the connecting assembly and includes a bracket, a translation member and a sliding member. The bracket has at least one first sliding slot. The translation member is translatably arranged on the bracket and has a second guide portion and at least one second sliding slot. The two first guide portions respectively correspond to the two second guide portions, and the first sliding slot and the second sliding slot are inclined to each other and partially overlapped at an overlapping position. The sliding member has at least one pillar, and the pillar penetrates the first sliding slot and the second sliding slot at the overlapping position. When each of the rotating assemblies rotates relative to the connecting assembly, the first guide portion and the second guide portion guide the translation member to translate relative to the bracket to displace the overlapping position, so as to drive the pillar to slide along the first sliding slot and the second sliding slot to drive the sliding member and a corresponding body to move.

In an embodiment of the invention, each of the first guide portions includes at least one first cam, and each of the second guide portions includes at least one second cam.

In an embodiment of the invention, the connecting assembly includes two connecting members, a number of the at least one first cam is two, the two first cams are respectively formed on the two connecting members and face each other, the translation member is located between the two connecting members, a number of the at least one second cam is two, and the two second cams are respectively formed at two opposite ends of the translation member and respectively face the two first cams.

In an embodiment of the invention, the two rotating assemblies are respectively rotatably connected to the connecting assembly along two rotation axes parallel to each other, and the translation member is translatably disposed on the bracket along a direction parallel to each of the rotation axes.

In an embodiment of the invention, the two rotating assemblies are respectively rotatably connected to the connecting assembly along two rotation axes parallel to each other, an extending direction of the first sliding slot is perpendicular to each of the rotation axes, and an extending direction of the second sliding slot is inclined to each of the rotation axes.

In an embodiment of the invention, each of the rotating assemblies further includes a rotating shaft, the rotating shaft is pivotally connected to the connecting assembly, the bracket is fixedly connected to the rotating shaft, and the translation member is translatably sleeved on the rotating shaft.

In an embodiment of the invention, the hinge structure further includes a linkage mechanism, and the linkage mechanism is connected between the two rotating assemblies and adapted to drive the two rotating assemblies to rotate synchronously.

In an embodiment of the invention, the linkage mechanism includes a gear set.

In an embodiment of the invention, when the two bodies are relatively expanded from a closed state or a reversely folded state to an expanded state, each of the sliding members moves in a direction approaching the connecting assembly, and when the two bodies are relatively closed from the expanded state to the closed state or relatively reversely folded from the expanded state to the reversely folded state, each of the sliding members moves in a direction away from the connecting assembly.

In an embodiment of the invention, when the two bodies are in the expanded state, an edge of each body leans against an edge of the other body.

Based on the above, in the invention, the connecting assembly, which is readily available in the hinge structure, is used to guide the translational movement of the translation member, and the relative movement of the first sliding slot of the bracket and the second sliding slot of the translation member stacked on each other are used to drive the sliding member slidably disposed in the sliding slots to move. Accordingly, the two bodies are driven to move relative to each other. In this way, it is not necessary to dispose a complicated link mechanism to drive the two bodies to move relative to each other. As a result, the configuration space of the electronic device can be saved, and the assembling and actuation accuracies of the electronic device can be facilitated.

DESCRIPTION OF THE EMBODIMENTS

Figure 1:
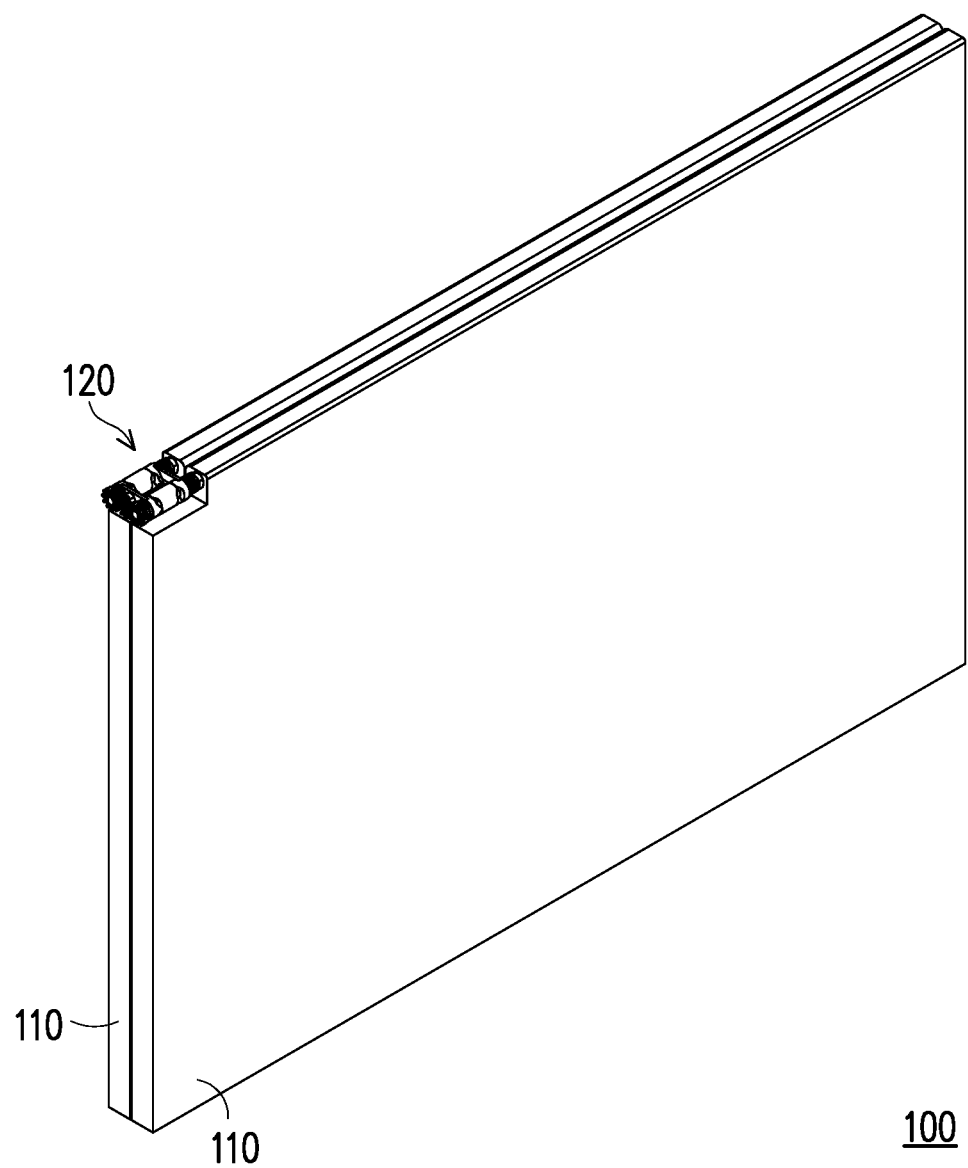
FIG. 1 is a three-dimensional schematic view of an electronic device according to an embodiment of the invention.
Figure 2:
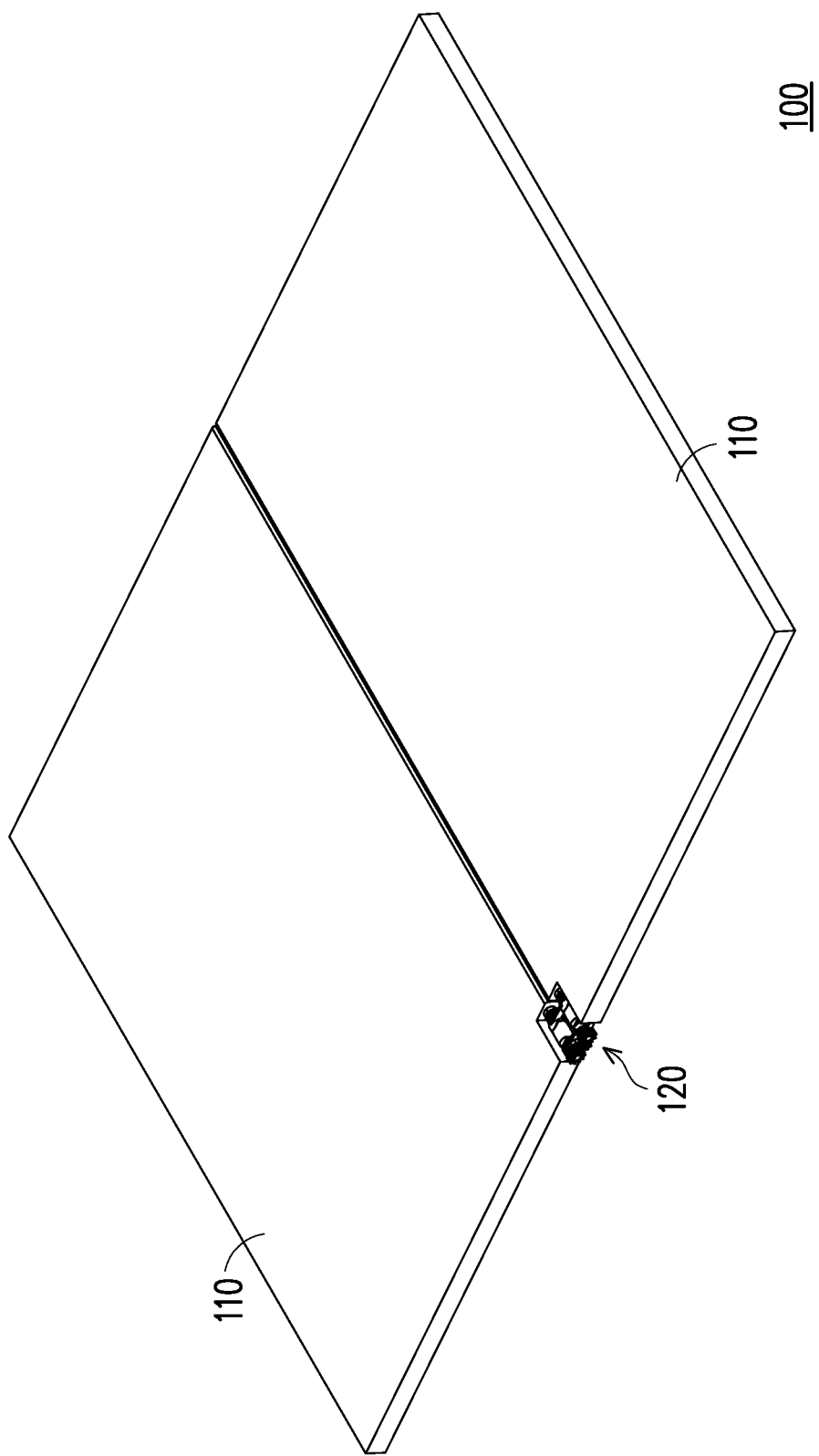
FIG. 2 illustrates the electronic device of FIG. 1 actuated to an expanded state.
Figure 3:
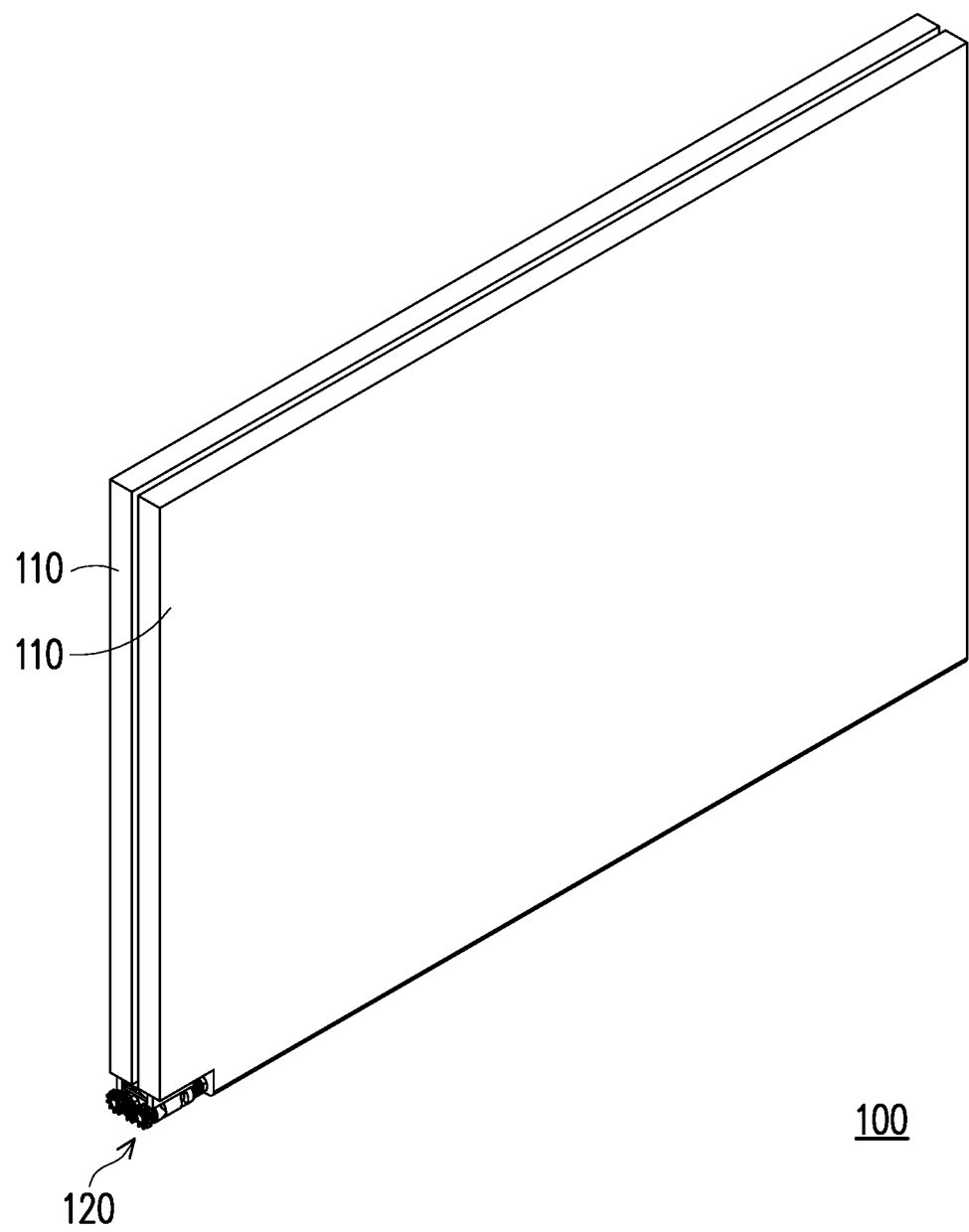
FIG. 3 illustrates the electronic device of FIG. 2 actuated to a reversely folded state.

FIG. 1 is a three-dimensional schematic view of an electronic device according to an embodiment of the invention. FIG. 2 illustrates the electronic device of FIG. 1 actuated to an expanded state. FIG. 3 illustrates the electronic device of FIG. 2 actuated to a reversely folded state. Referring to FIG. 1 to FIG. 3, an electronic device 100 of the embodiment includes two bodies 110 and at least one hinge structure 120 (one hinge structure is illustrated). The two bodies 110 are pivotally connected to each other by the hinge structure 120, and the two bodies 110 may be relatively rotated from a closed state shown in FIG. 1 to an expanded state shown in FIG. 2, and may be continually rotated relatively from the expanded state shown in FIG. 2 to the reversely folded state shown in FIG. 3.

The electronic device 100 of the embodiment may be a dual-screen notebook computer or smart phone, and the two bodies 110 are respectively display screens. However, the invention is not limited thereto, and the two bodies 110 may be respectively a display screen and an input device (such as a keyboard module) or other types of functional assemblies. Moreover, the invention does not limit the number and a configuration position of the hinge structure 120. For example, the number of the hinge structures 120 may be two and the two hinge structures 120 are arranged at intervals.

Figure 4:
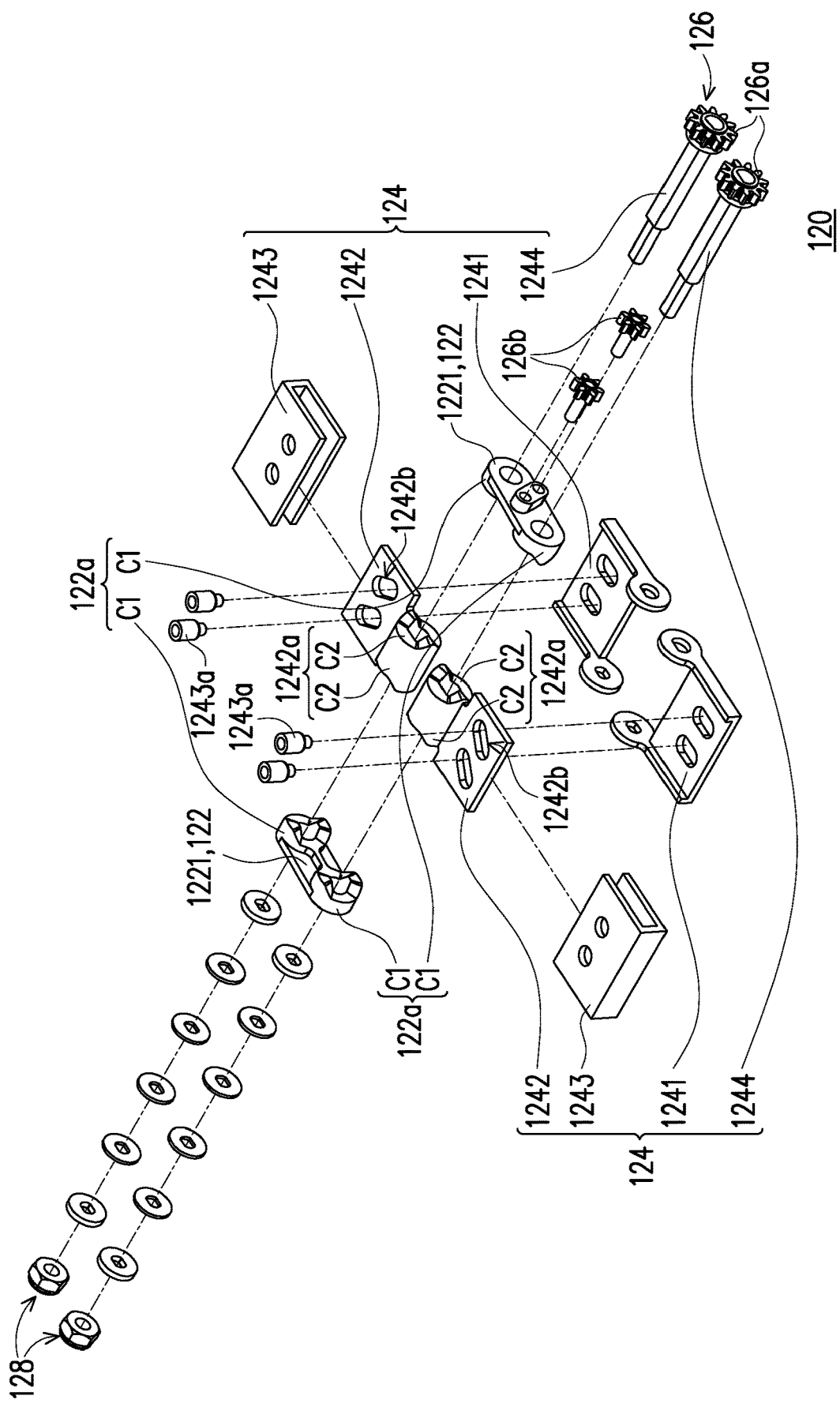
FIG. 4 is an exploded view of a hinge structure of FIG. 1.
Figure 5:
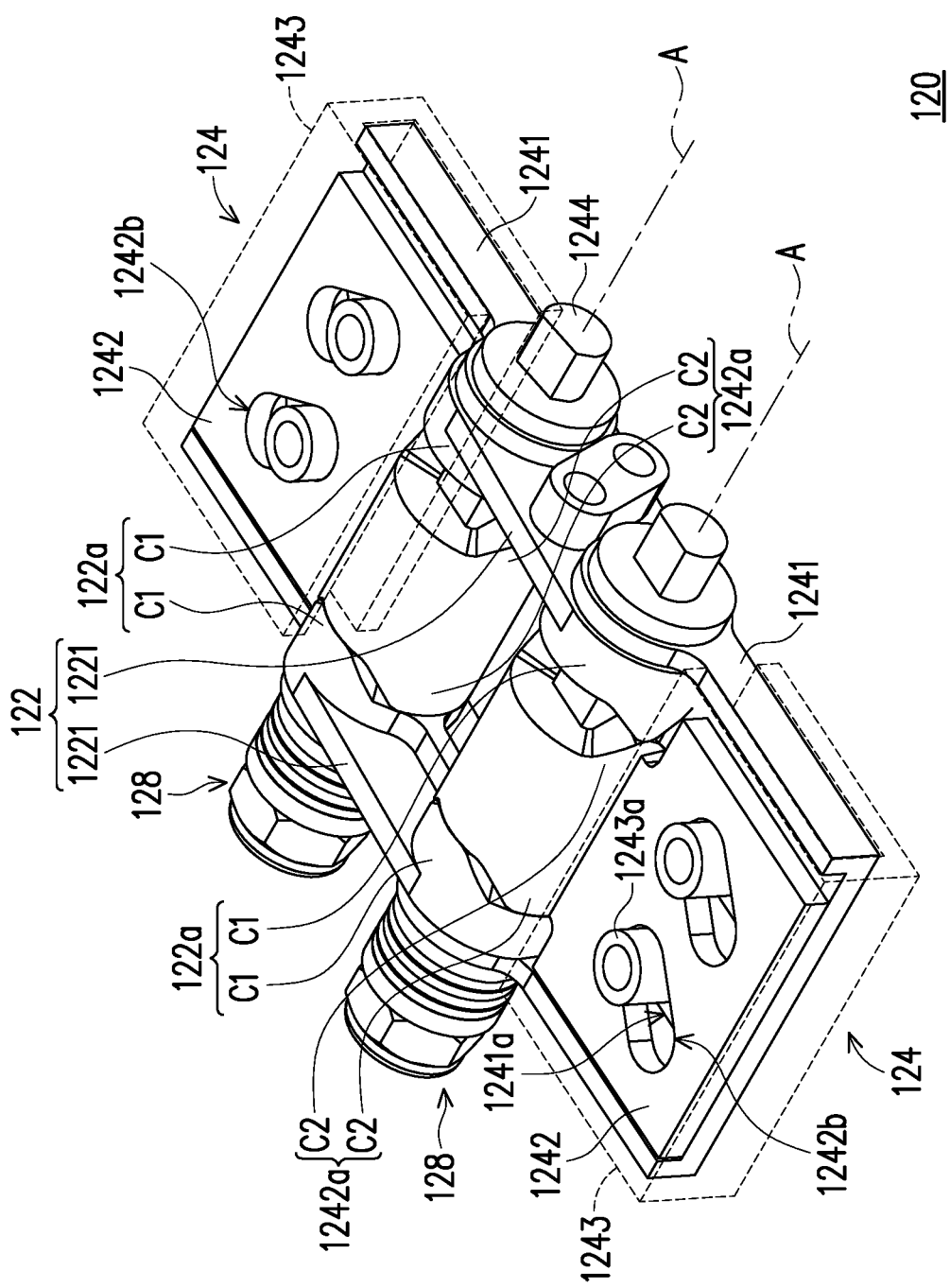
FIG. 5 is a three-dimensional view of some components of the hinge structure of FIG. 1.

FIG. 4 is an exploded view of the hinge structure of FIG. 1. FIG. 5 is a three-dimensional view of some components of the hinge structure of FIG. 1, which corresponds to the expanded state shown in FIG. 2. FIG. 6A to FIG. 6E are views illustrating actuations of the hinge structure of FIG. 4, where FIG. 6A corresponds to the closed state shown in FIG. 1, FIG. 6C corresponds to the expanded state shown in FIG. 2, and FIG. 6E corresponds to the reversely folded state shown in FIG. 3. The hinge structure 120 of the embodiment includes a connecting assembly 122 and two rotating assemblies 124 as shown in FIGS. 4 and 5. The two rotating assemblies 124 are respectively rotatably connected to the connecting assembly 122 along two rotation axes A (indicated in FIG. 5) parallel to each other, and the two bodies 110 (shown in FIG. 1 to FIG. 3) are respectively connected to the two rotating assemblies 124, and the two bodies 110 are relatively rotated along with the rotation of the two rotating assemblies 124 relative to the connecting assembly 122 as shown in FIG. 6A to FIG. 6E.

In detail, the connecting assembly 122 has two first guide portions 122a. Each of the rotating assemblies 124 includes a bracket 1241, a translation member 1242, a sliding member 1243 and a rotating shaft 1244. The rotating shaft 1244 is pivotally connected to the connecting assembly 122 along a rotation axis A, and the bracket 1241 is fixedly connected to the rotating shaft 1244. The bracket 1241 has at least one first sliding slot 1241a (two sliding slots are illustrated). The translation member 1242 is translatably sleeved on the rotating shaft 1244 in a direction parallel to each rotation axis A and is translatably disposed on the bracket 1241, and the translation member 1242 has a second guide portion 1242a and at least one second sliding slot 1242b (two sliding slots are illustrated). An extending direction of each first sliding slot 1241a is perpendicular to each rotation axis A, and an extending direction of each second sliding slot 1242b is inclined to each rotation axis A, so that each first sliding slot 1241a and the corresponding second sliding slot 1242b are inclined to each other. The two first guide portions 122a of the connecting assembly 122 respectively correspond to the two second guide portions 1242a of the translation member 1242. The sliding member 1243 has at least one pillar 1243a (two pillars are illustrated), the pillar 1243a passes through and is slidably disposed in the corresponding first sliding slot 1241a and the second sliding slot 1242b, so that each sliding member 1243 may be slidably disposed on the corresponding bracket 1241. The two bodies 110 (shown in FIG. 1 to FIG. 3) are respectively connected to the two sliding members 1243, and may slide together with the sliding members 1243.

Figure 6A:
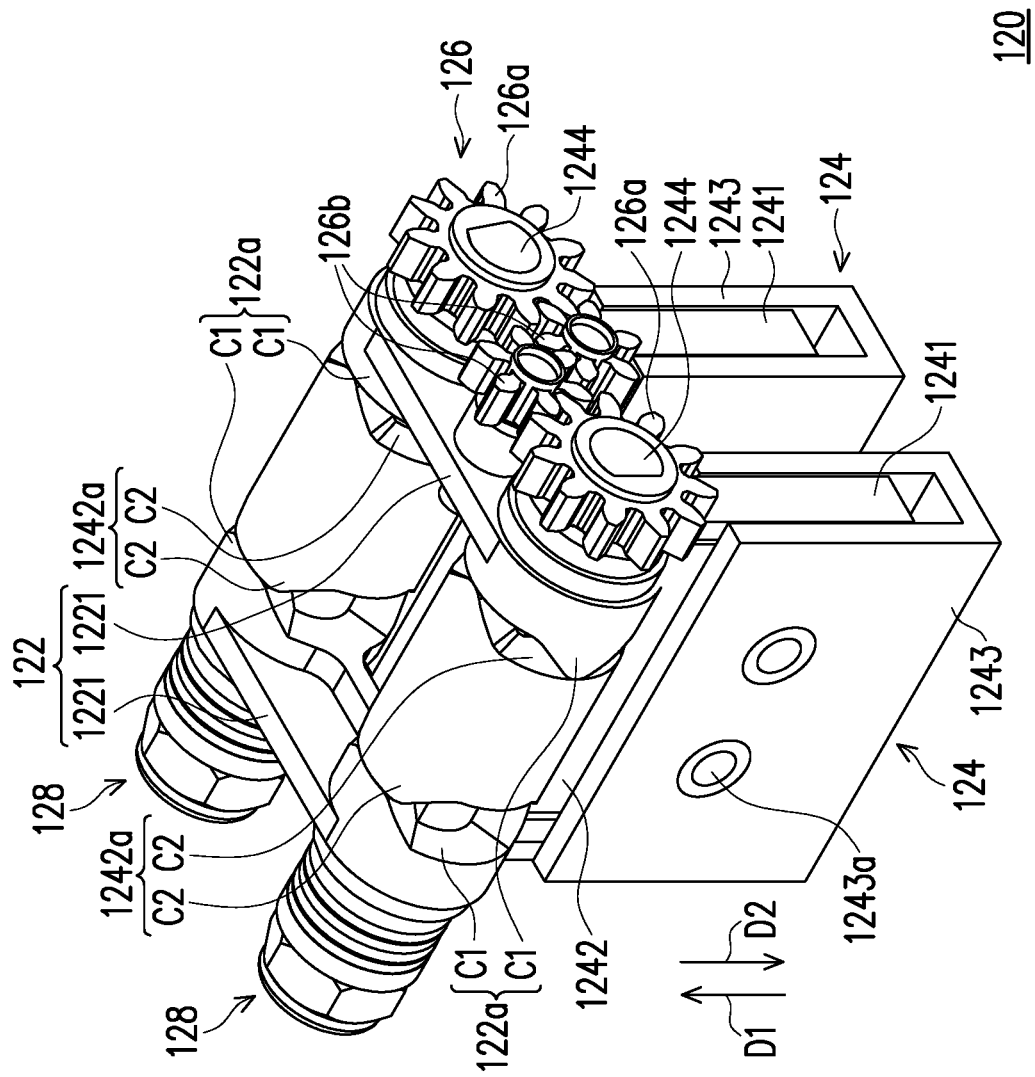
FIG. 6A to FIG. 6E are views illustrating actuations of the hinge structure of FIG. 4.
Figure 6B:
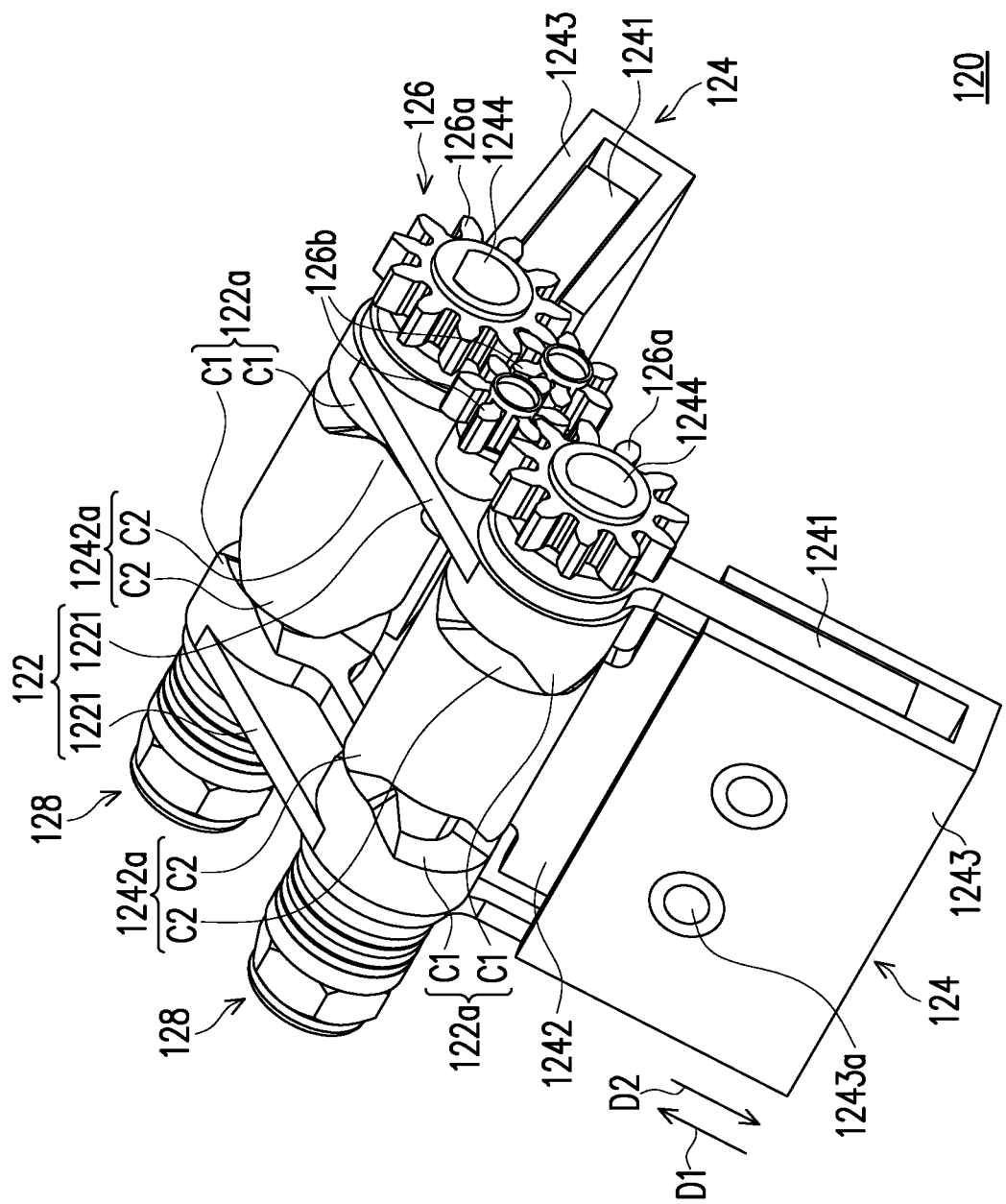
Figure 6C:
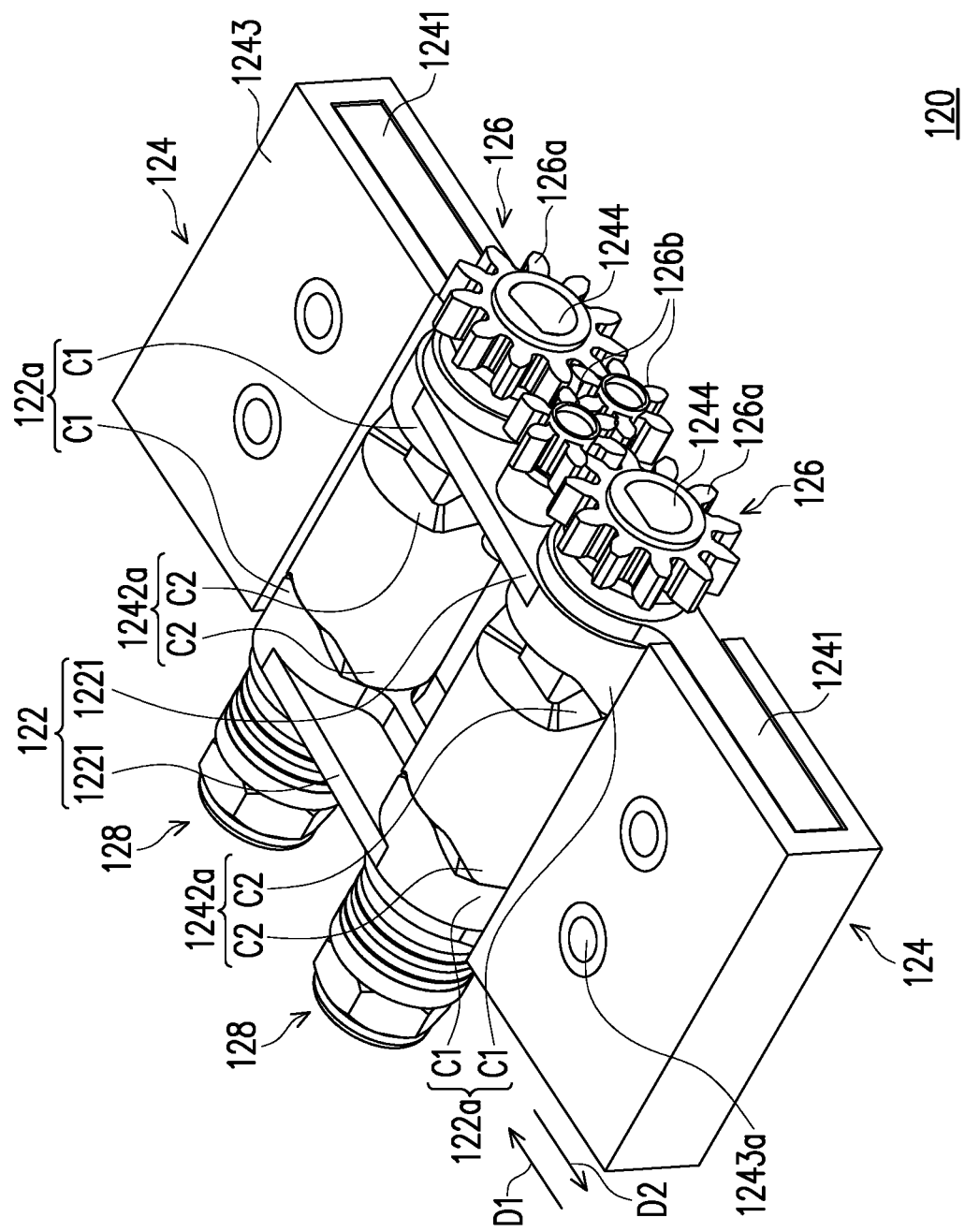
Figure 7A:
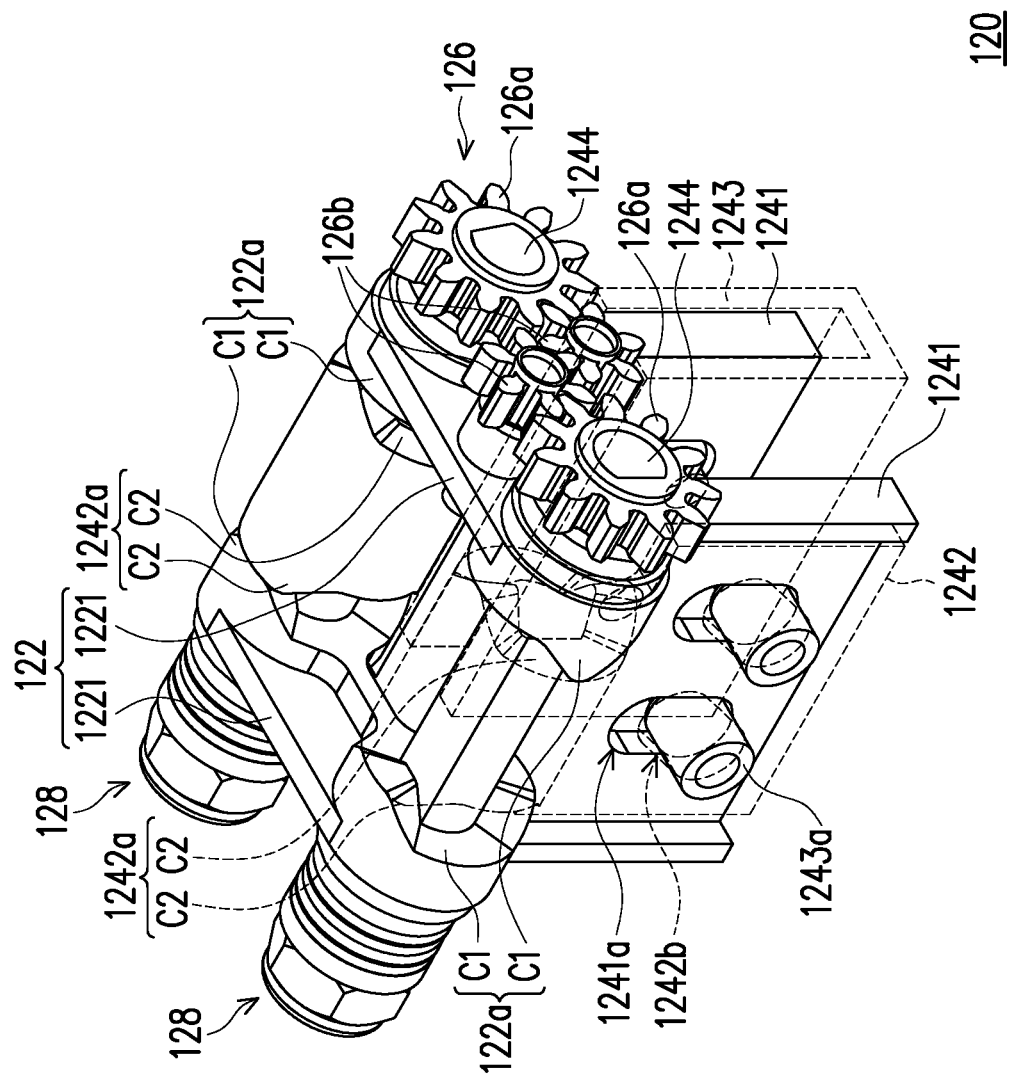
FIG. 7A to FIG. 7C are respectively perspective views of some components of the hinge structure of FIG. 6A to FIG. 6C.
Figure 7B:
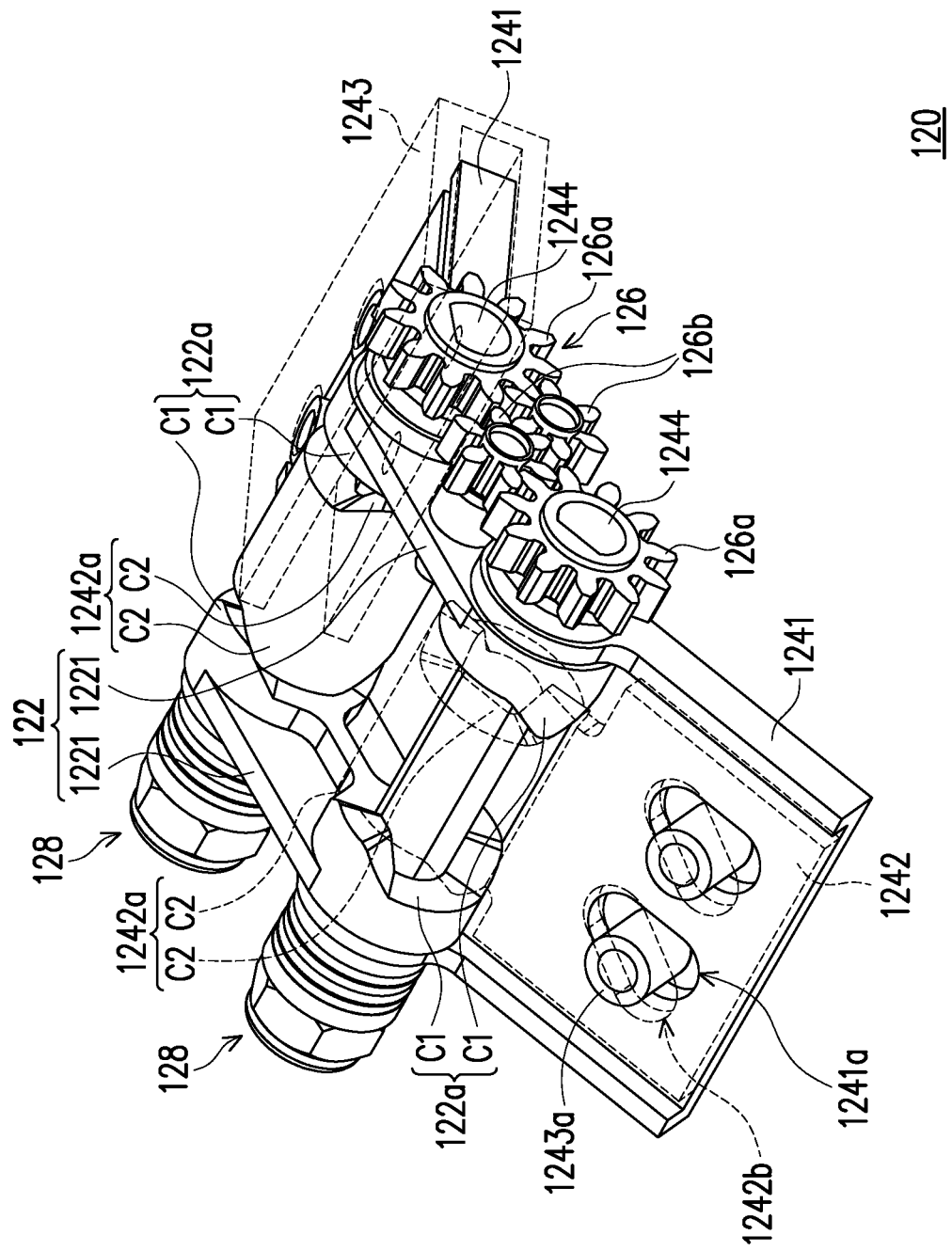
Figure 7C:
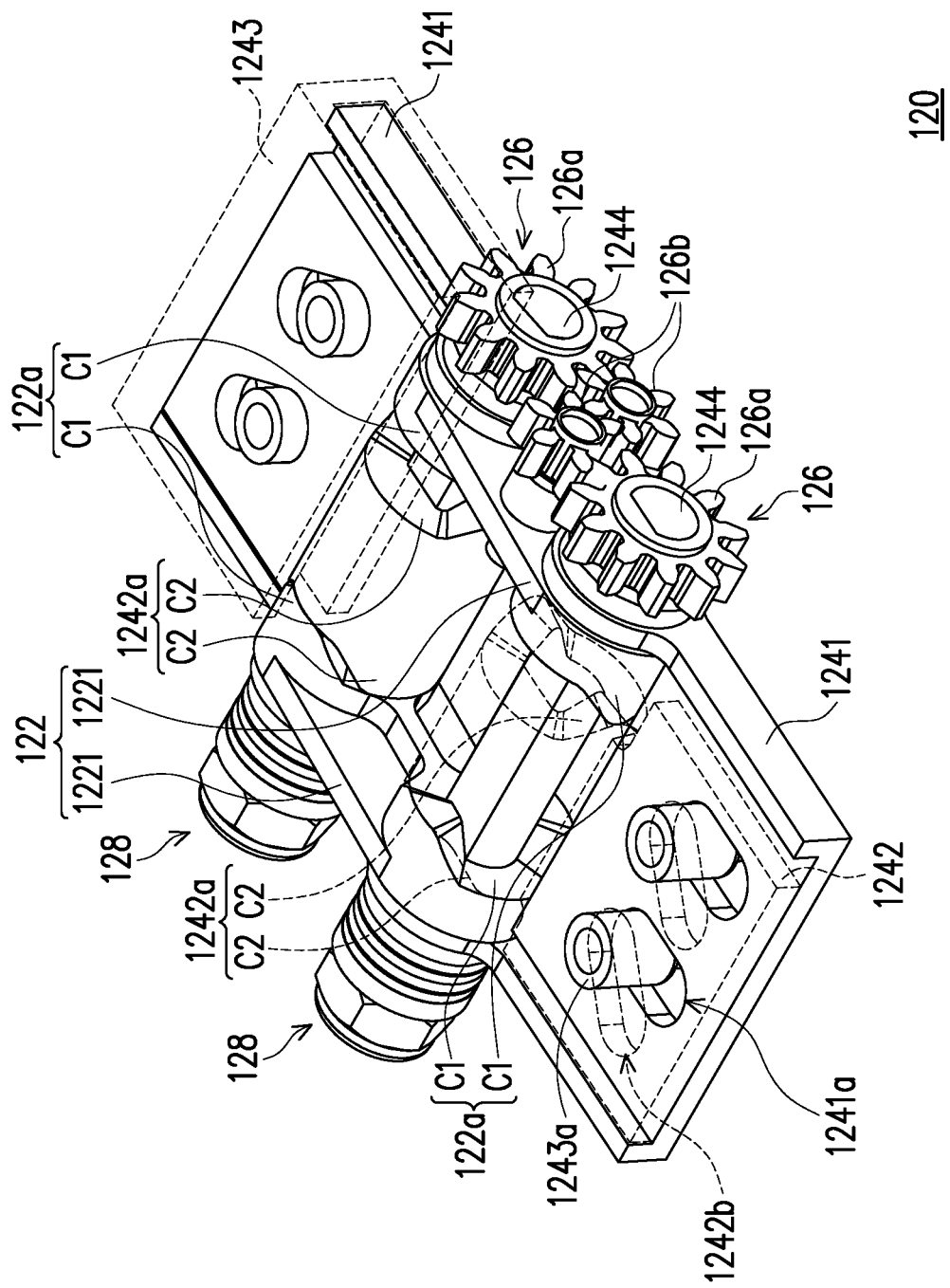
Figure 8:
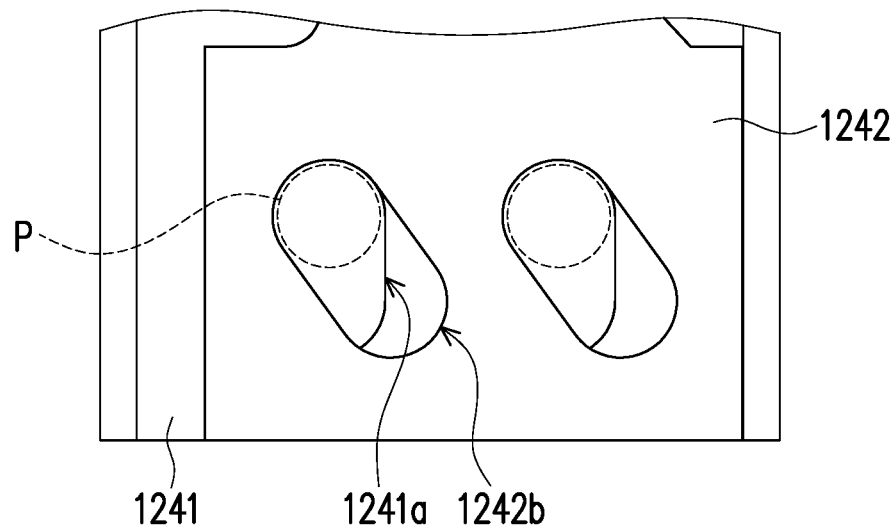
FIG. 8 and FIG. 9 illustrate relative movement of a first sliding slot and a second sliding slot of FIG. 5.
Figure 9:
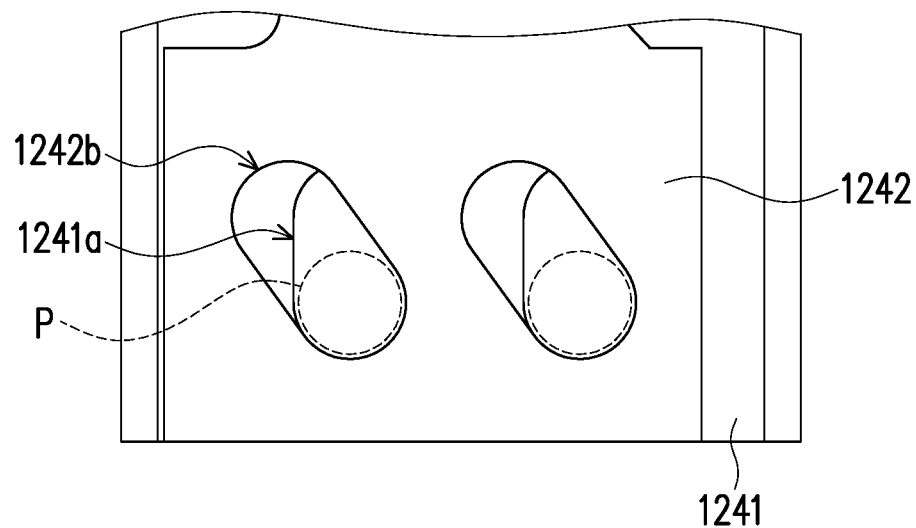

FIG. 7A to FIG. 7C are respectively perspective views of some components of the hinge structure of FIG. 6A to FIG. 6C. FIG. 8 and FIG. 9 illustrate relative movement of the first sliding slot and the second sliding slot of FIG. 5, where FIG. 8 corresponds to the closed state shown in FIG. 1 and the reversely folded state shown in FIG. 3, and FIG. 9 corresponds to the expanded state shown in FIG. 2. Referring to FIG. 7A to FIG. 9, each first sliding slot 1241a and the corresponding second sliding slot 1242b are partially overlapped at an overlapping position P (indicated in FIG. 8 and FIG. 9), and each pillar 1243a penetrates the corresponding first sliding slot 1241a and the corresponding second sliding slot 1242 at the overlapping position P.

Figure 6D:
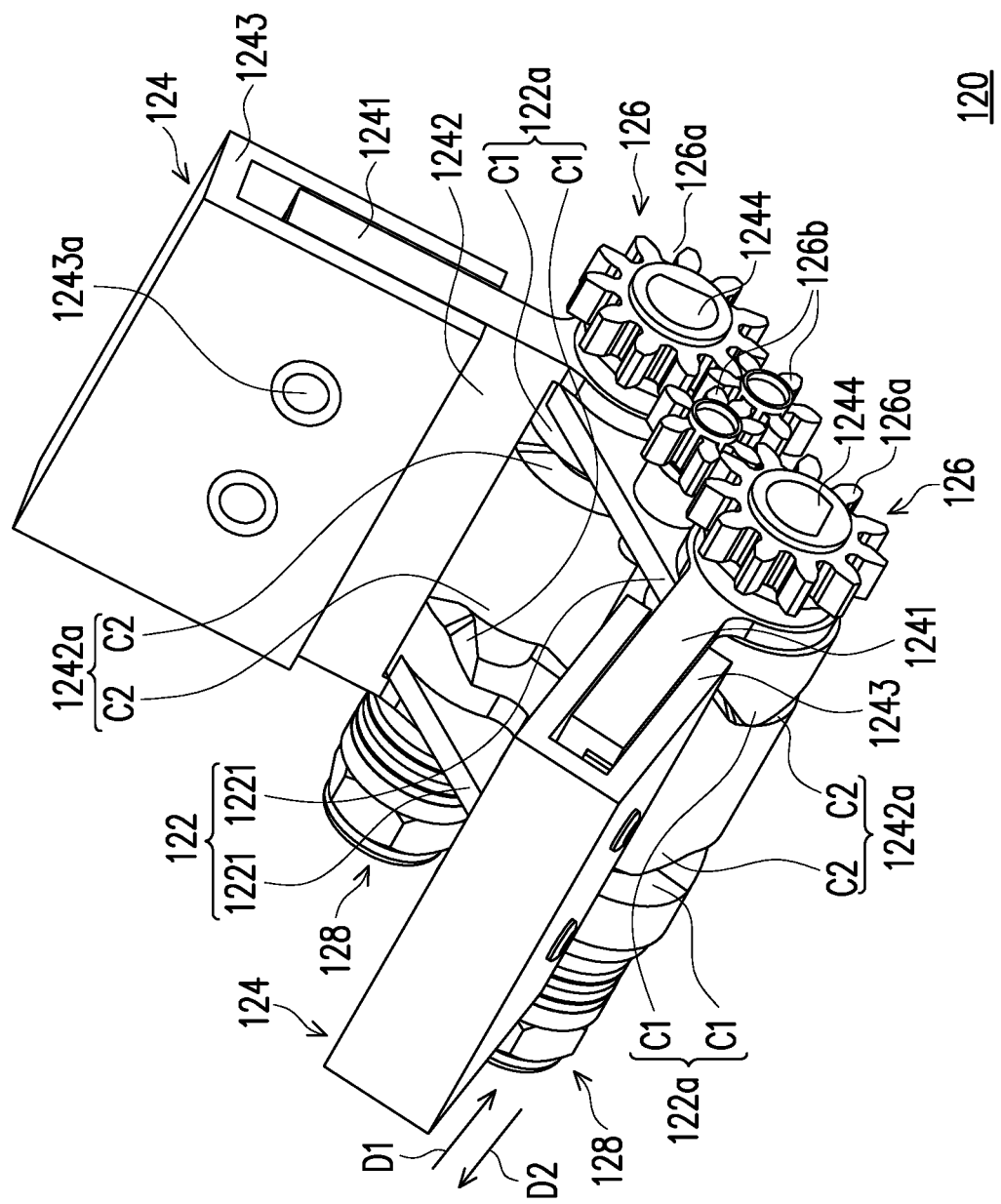
Figure 6E:
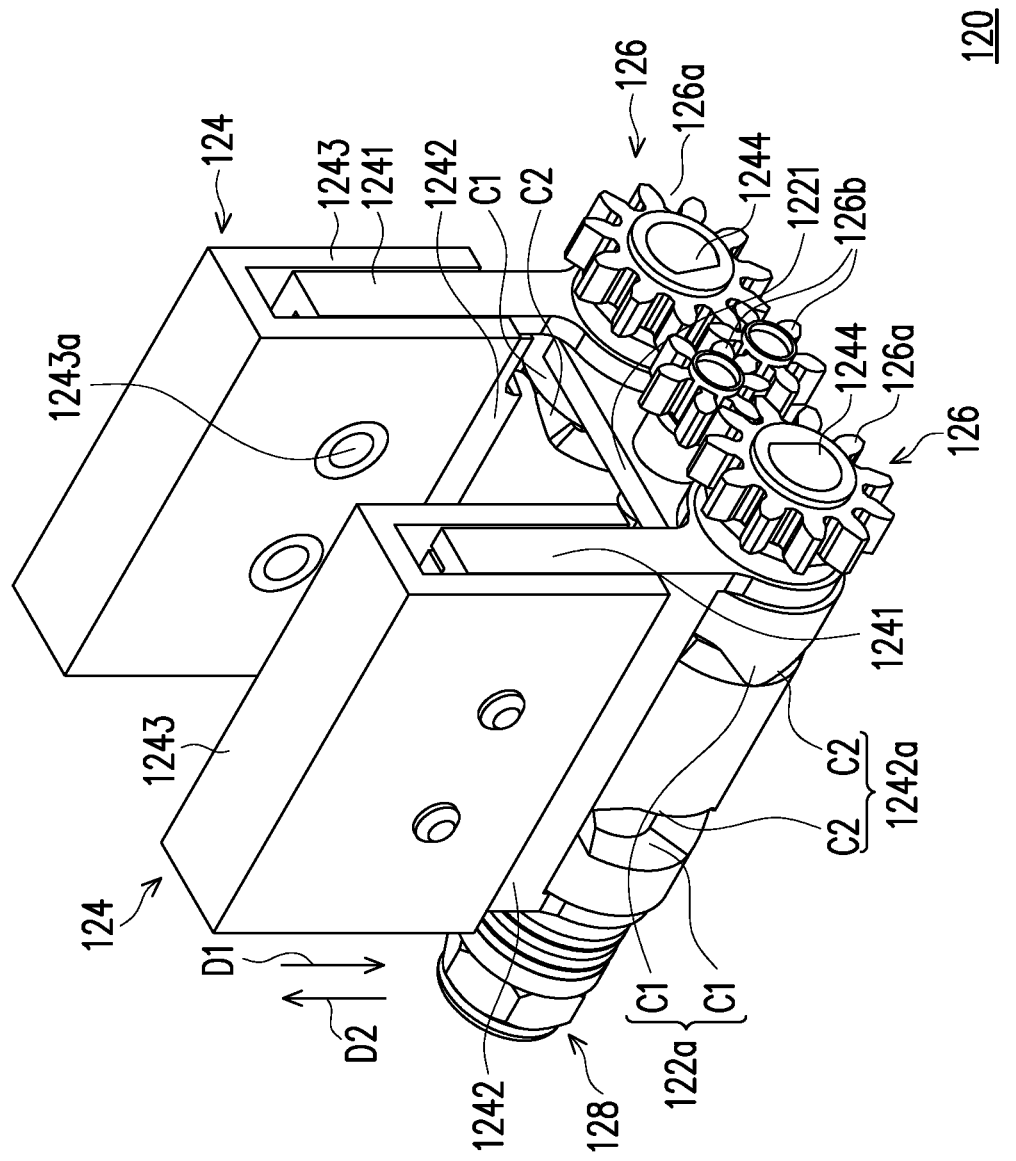

Based on the above description, when each rotating assembly 124 is rotated relative to the connecting assembly 122 as shown in FIG. 6A to FIG. 6C to make the two bodies 110 to be relatively expanded from the closed state shown in FIG. 1 to the expanded state shown in FIG. 2, each first guide portion 122a and each second guide portion 1242a guide the corresponding translation member 1242 to translate relative to the bracket 1241 so that the overlapping position P of each first sliding slot 1241a and the corresponding second sliding slot 1242b has a displacement as shown in FIG. 8 to FIG. 9, which forces each pillar 1243a to slide along the corresponding first sliding slot 1241a and the second sliding slot 1242b to drive the sliding member 1243 and the corresponding body 110 to move. During such process, each sliding member 1243 and the corresponding body 110 move along a direction D1 approaching the connecting assembly 122 as shown in FIG. 6A to FIG. 6C. Similarly, when each rotating assembly 124 is rotated relative to the connecting assembly 122 as shown in FIG. 6E to FIG. 6C to make the two bodies 110 to be relatively expanded from the reversely folded state shown in FIG. 3 to the expanded state shown in FIG. 2, each first guide portion 122a and each second guide portion 1242a guide the corresponding translation member 1242 to translate relative to the bracket 1241 so that the overlapping position P of each first sliding slot 1241a and the corresponding second sliding slot 1242b has a displacement as shown in FIG. 8 to FIG. 9, which forces each pillar 1243a to slide along the corresponding first sliding slot 1241a and the second sliding slot 1242b to drive the sliding member 1243 and the corresponding body 110 to move. During such process, each sliding member 1243 and the corresponding body 110 move along the direction D1 approaching the connecting assembly 122 as shown in FIG. 6A to FIG. 6C. In this way, when the two bodies 110 are in the expanded state shown in FIG. 2, an edge of each body 110 leans against an edge of the other body 110, so that the two bodies 110 are visually and structurally continuous.

On the other hand, when each rotating assembly 124 is rotated relative to the connecting assembly 122 as shown in FIG. 6C to FIG. 6A to make the two bodies 110 to be relatively closed from the expanded state shown in FIG. 2 to the closed state shown in FIG. 1, each first guide portion 122a and each second guide portion 1242a guide the corresponding translation member 1242 to translate relative to the bracket 1241 so that the overlapping position P of each first sliding slot 1241a and the corresponding second sliding slot 1242b has a displacement as shown in FIG. 9 to FIG. 8, which forces each pillar 1243a to slide along the corresponding first sliding slot 1241a and the second sliding slot 1242b to drive the sliding member 1243 and the corresponding body 110 to move. During such process, each sliding member 1243 and the corresponding body 110 move along a direction D2 away from the connecting assembly 122 as shown in FIG. 6C to FIG. 6A. Similarly, when each rotating assembly 124 is rotated relative to the connecting assembly 122 as shown in FIG. 6C to FIG. 6E to make the two bodies 110 to be relatively reversely folded from the expanded state shown in FIG. 2 to the reversely folded state shown in FIG. 3, each first guide portion 122a and each second guide portion 1242a guide the corresponding translation member 1242 to translate relative to the bracket 1241 so that the overlapping position P of each first sliding slot 1241a and the corresponding second sliding slot 1242b has a displacement as shown in FIG. 9 to FIG. 8, which forces each pillar 1243a to slide along the corresponding first sliding slot 1241a and the second sliding slot 1242b to drive the sliding member 1243 and the corresponding body 110 to move. During such process, each sliding member 1243 and the corresponding body 110 move along the direction D2 away from the connecting assembly 122 as shown in FIG. 6C to FIG. 6A. In this way, a situation that the edges of the two bodies 110 are too close to each other to prevent the two bodies 110 from being relatively closed or relatively reversely folded due to structural interference is avoided.

As described above, in the embodiment, the connecting assembly 122 of the hinge structure 120 is used to guide the translation of the translation member 1242, and the relative movement of the first sliding slot 1241a of the bracket 1241 and the second sliding slot 1242b of the translation member 1242 that are stacked on each other is used to drive the sliding member 1243 slidably disposed in the sliding slots to move, so as to drive the two bodies 110 to move relative to each other. In this way, there is no need to use a complicated link mechanism to drive the two bodies 110 to move relative to each other, which saves a configuration space of the electronic device 100 and improves assembling and actuation accuracies of the electronic device 100.

Figure 10:
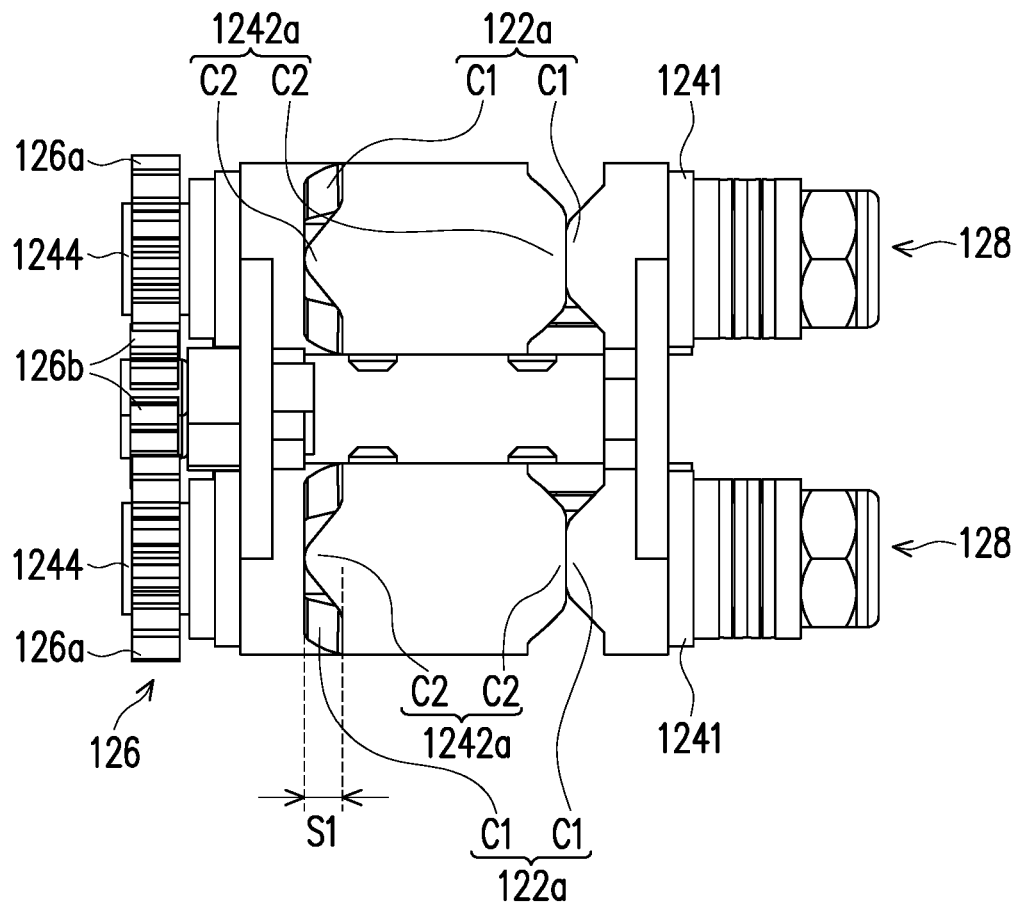
FIG. 10 is a top view of the hinge structure of FIG. 6A.
Figure 11:
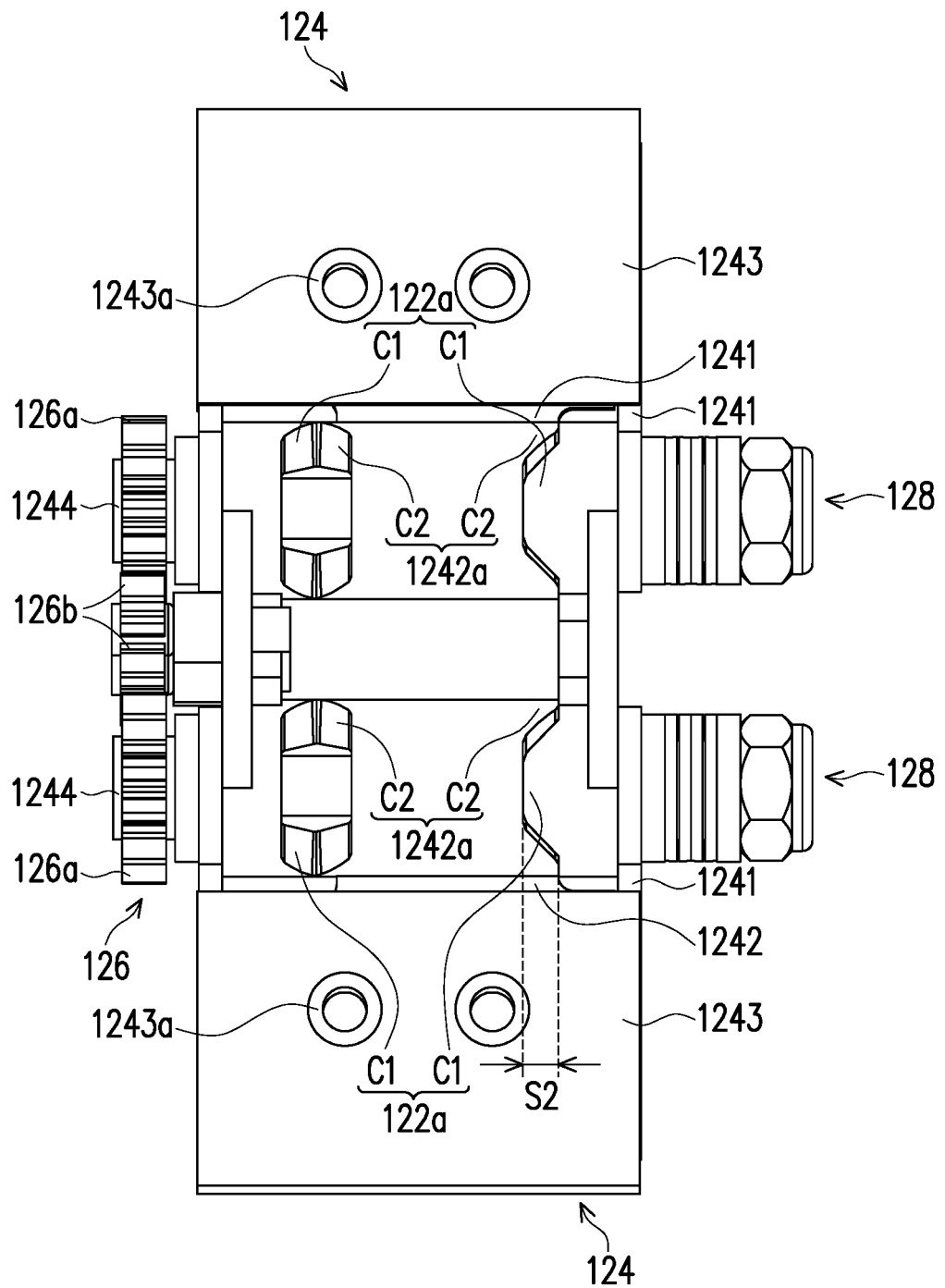
FIG. 11 is a top view of the hinge structure of FIG. 6C.

The specific structures of the first guide portion 122a and the second guide portion 1242a of the embodiment are described below. Referring to FIG. 4 and FIG. 5, the connecting assembly 122 of the embodiment includes two connecting members 1221, each first guide portion 122a includes two first cams C1, and the two first cams C1 are respectively formed on the two connecting members 1221 and face each other. The translation member 1242 is located between the two connecting members 1221, and the second guide portion 1242a thereof includes two second cams C2, and the two second cams C2 are respectively formed at two opposite ends of the translation member 1242 and respectively face the two first cams C1. FIG. 10 is a top view of the hinge structure of FIG. 6A. FIG. 11 is a top view of the hinge structure of FIG. 6C. In the embodiment, a gradient stroke S1 of each first cam C1 (indicated in FIG. 10) and a gradient stroke S2 of each second cam C2 are, for example, equivalent, and equal to the maximum displacement of the translation member 1242.

Referring to FIG. 4 and FIG. 6A, the hinge structure 120 of the embodiment further includes a linkage mechanism 126. The linkage mechanism 126 is, for example, a gear set and is connected between the two rotating assemblies 124 to drive the two rotating assemblies 124 to rotate synchronously. In this way, the two bodies 110 (shown in FIG. 1 to FIG. 3) are ensured to rotate synchronously. To be specific, the gear set may include two first gears 126a and two second gears 126b, the two first gears 126a are respectively arranged coaxially with the two rotating shafts 1244, and the two second gears 126b are coupled between the two first gears 126a. In addition, the hinge structure of the embodiment further includes two torsion element groups 128, which are respectively installed on the two rotating shafts 1244 to provide a required torque of the hinge structure 120.

Figure 12:
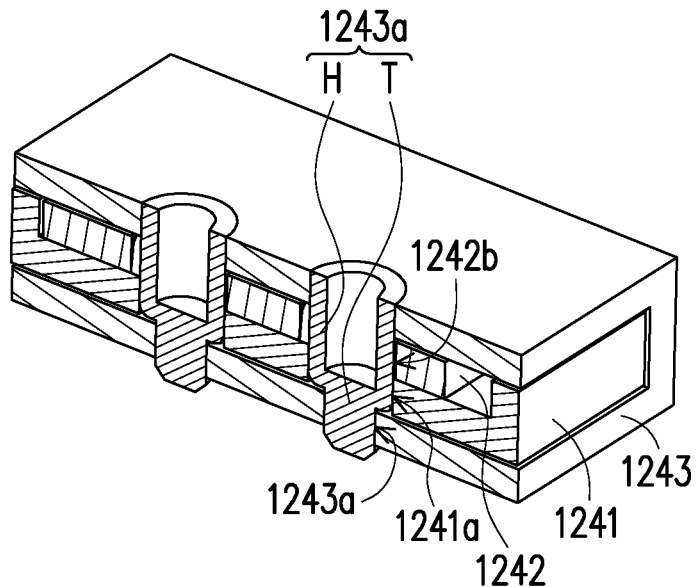
FIG. 12 is a three-dimensional view illustrating a partial structure of the hinge structure of FIG. 6C.
Figure 13:
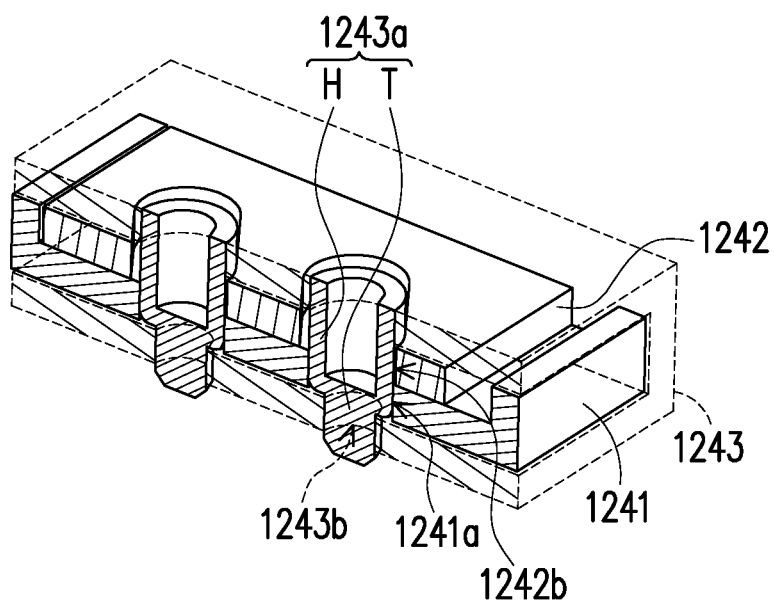
FIG. 13 is a perspective view of the hinge structure of FIG. 12.

FIG. 12 is a three-dimensional view illustrating a partial structure of the hinge structure of FIG. 6C, and a cross-section thereof corresponds to a line I-I of FIG. 6C. FIG. 13 is a perspective view of the hinge structure of FIG. 12. Referring to FIG. 12 and FIG. 13, each pillar 1243a of the embodiment is, for example, a screw, a thread portion T thereof is screwed into a screw hole 1243b of the sliding member 1243, and a head portion H thereof is slidably disposed on the first sliding slot 1241a of the bracket 1241 and the second sliding slot 1242b of the translation member 1242. In other embodiments, each pillar 1243a may be fixed to the sliding member 1243 by other means and slidably disposed on the first sliding slot 1241a of the bracket 1241 and the second sliding slot 1242b of the translation member 1242, which is not limited by the invention.

In summary, in the invention, the connecting assembly, which is readily available in the hinge structure, is used to guide the translational movement of the translation member, and the relative movement of the first sliding slot of the bracket and the second sliding slot of the translation member stacked on each other are used to drive the sliding member slidably disposed in the sliding slots to move. Accordingly, the two bodies are driven to move relative to each other. In this way, it is not necessary to dispose a complicated link mechanism to drive the two bodies to move relative to each other. As a result, the configuration space of the electronic device can be saved, and the assembling and actuation accuracies of the electronic device can be facilitated.

What is claimed is:

1. An electronic device, comprising:
    two bodies; and
    at least one hinge structure, comprising a connecting assembly and two rotating assemblies, wherein the connecting assembly has two first guide portions, and each of the rotating assemblies is rotatably connected to the connecting assembly and comprises:
        a bracket, having at least one first sliding slot;
        a translation member, translatably arranged on the bracket and having a second guide portion and at least one second sliding slot, wherein the two first guide portions respectively correspond to the second guide portion of one of the rotating assembly and the second guide portion of another one of the rotating assembly, and the at least one first sliding slot and the at least one second sliding slot are inclined to each other and partially overlapped at an overlapping position;
        a sliding member, having at least one pillar, wherein the at least one pillar penetrates the at least one first sliding slot and the at least one second sliding slot at the overlapping position, and the two bodies are respectively connected to the sliding member of one of the rotating assembly and the sliding member of another one of the rotating assembly,
    wherein when each of the rotating assemblies rotates relative to the connecting assembly, the at least one first guide portion and the at least one second guide portion guide the translation member to translate relative to the bracket to displace the overlapping position, so as to drive the at least one pillar to slide along the at least one first sliding slot and the at least one second sliding slot to drive the sliding member and the corresponding body to move; and
    a rotating shaft, pivotally connected to the connecting assembly, wherein the bracket is fixedly connected to the rotating shaft, and the translation member is translatably sleeved on the rotating shaft.

2. The electronic device as claimed in claim 1, wherein each of the first guide portions comprises at least one first cam, and each of the second guide portions comprises at least one second cam.

3. The electronic device as claimed in claim 2, wherein the connecting assembly comprises two connecting members, a number of the at least one first cam is two, the two first cams are respectively formed on the two connecting members and face each other, the translation member is located between the two connecting members, a number of the at least one second cam is two, and the two second cams are respectively formed at two opposite ends of the translation member and respectively face the two first cams.

4. The electronic device as claimed in claim 1, wherein the two rotating assemblies are respectively rotatably connected to the connecting assembly along two rotation axes parallel to each other, and the translation member is translatably disposed on the bracket along a direction parallel to each of the rotation axes.

5. The electronic device as claimed in claim 1, wherein the two rotating assemblies are respectively rotatably connected to the connecting assembly along two rotation axes parallel to each other, an extending direction of the at least one first sliding slot is perpendicular to each of the rotation axes, and an extending direction of the at least one second sliding slot is inclined to each of the rotation axes.

6. The electronic device as claimed in claim 1, wherein the at least one hinge structure further comprises a linkage mechanism, and the linkage mechanism is connected between the two rotating assemblies and adapted to drive the two rotating assemblies to rotate synchronously.

7. The electronic device as claimed in claim 6, wherein the linkage mechanism comprises a gear set.

8. The electronic device as claimed in claim 1, wherein when the two bodies are relatively expanded from a closed state or a reversely folded state to an expanded state, each of the sliding members moves in a direction approaching the connecting assembly, and when the two bodies are relatively closed from the expanded state to the closed state or relatively reversely folded from the expanded state to the reversely folded state, each of the sliding members moves in a direction away from the connecting assembly.

9. The electronic device as claimed in claim 8, wherein when the two bodies are in the expanded state, an edge of each of the bodies leans against an edge of the other body.

10. A hinge structure, comprising:
    a connecting assembly, having two first guide portions; and
    two rotating assemblies, each of the rotating assemblies being rotatably connected to the connecting assembly and comprising:
        a bracket, having at least one first sliding slot;
        a translation member, translatably arranged on the bracket and having a second guide portion and at least one second sliding slot, wherein the two first guide portions respectively correspond to the second guide portion of one of the rotating assembly and the second guide portion of another one of the rotating assembly, and the at least one first sliding slot and the at least one second sliding slot are inclined to each other and partially overlapped at an overlapping position;
        a sliding member, having at least one pillar, wherein the at least one pillar penetrates the at least one first sliding slot and the at least one second sliding slot at the overlapping position,
    wherein when each of the rotating assemblies rotates relative to the connecting assembly, the at least one first guide portion and the at least one second guide portion guide the translation member to translate relative to the bracket to displace the overlapping position, so as to drive the at least one pillar to slide along the at least one first sliding slot and the at least one second sliding slot to drive the sliding member to move; and a rotating shaft, pivotally connected to the connecting assembly, wherein the bracket is fixedly connected to the rotating shaft, and the translation member is translatably sleeved on the rotating shaft.

11. The hinge structure as claimed in claim 10, wherein each of the first guide portions comprises at least one first cam, and each of the second guide portions comprises at least one second cam.

12. The hinge structure as claimed in claim 11, wherein the connecting assembly comprises two connecting members, a number of the at least one first cam is two, the two first cams are respectively formed on the two connecting members and face each other, the translation member is located between the two connecting members, a number of the at least one second cam is two, and the two second cams are respectively formed at two opposite ends of the translation member and respectively face the two first cams.

13. The hinge structure as claimed in claim 10, wherein the two rotating assemblies are respectively rotatably connected to the connecting assembly along two rotation axes parallel to each other, and the translation member is translatably disposed on the bracket along a direction parallel to each of the rotation axes.

14. The hinge structure as claimed in claim 10, wherein the two rotating assemblies are respectively rotatably connected to the connecting assembly along two rotation axes parallel to each other, an extending direction of the at least one first sliding slot is perpendicular to each of the rotation axes, and an extending direction of the at least one second sliding slot is inclined to each of the rotation axes.

15. The hinge structure as claimed in claim 10, further comprising a linkage mechanism, wherein the linkage mechanism is connected between the two rotating assemblies and adapted to drive the two rotating assemblies to rotate synchronously.

16. The hinge structure as claimed in claim 15, wherein the linkage mechanism comprises a gear set.

* * * * *